United States Patent

[11] 3,593,086

| [72] | Inventor | Duncan Ulick Thombs<br>Basingstoke, England |
|---|---|---|
| [21] | Appl. No. | 12,757 |
| [22] | Filed | Feb. 19, 1970 |
| [45] | Patented | July 13, 1971 |
| [73] | Assignee | Lansing Bagnall Limited<br>Basingstoke, England |
| [32] | Priority | Feb. 28, 1969 |
| [33] | | Great Britain |
| [31] | | 10898/69 |

[54] DIRECT CURRENT MOTOR CIRCUITS
6 Claims, 1 Drawing Fig.

[52] U.S. Cl. ............................................. 318/308,
318/341, 318/356
[51] Int. Cl. .............................................. H02p 5/16,
H02p 7/10
[50] Field of Search ........................................ 318/301,
308, 341, 345, 351, 356, 523

[56] References Cited
UNITED STATES PATENTS

| 2,870,390 | 1/1959 | Ludwig......................... | 318/356 X |
| 3,441,827 | 4/1969 | Payne........................... | 318/341 X |
| 3,500,161 | 3/1970 | Domann et al. ................ | 318/308 |
| 3,518,518 | 6/1970 | Ford et al. ..................... | 318/308 |

Primary Examiner—Oris L. Rader
Assistant Examiner—Robert J. Hickey
Attorney—Martin Kirkpatrick ABSTRACT: A direct current motor circuit in which power in the motor is controlled by a main controllable rectifier whose condition is terminated by an auxiliary controllable rectifier fed with trigger signals alternately with the main rectifier. A winding coupled to a magnetic circuit inhibits the triggering of the auxiliary rectifier when the magnetic flux density in the magnetic circuit is high. The actual flux density is a balance between a flux produced by the field current of the motor, an opposing flux from an adjustable magnet and a flux produced by the armature current of the motor.

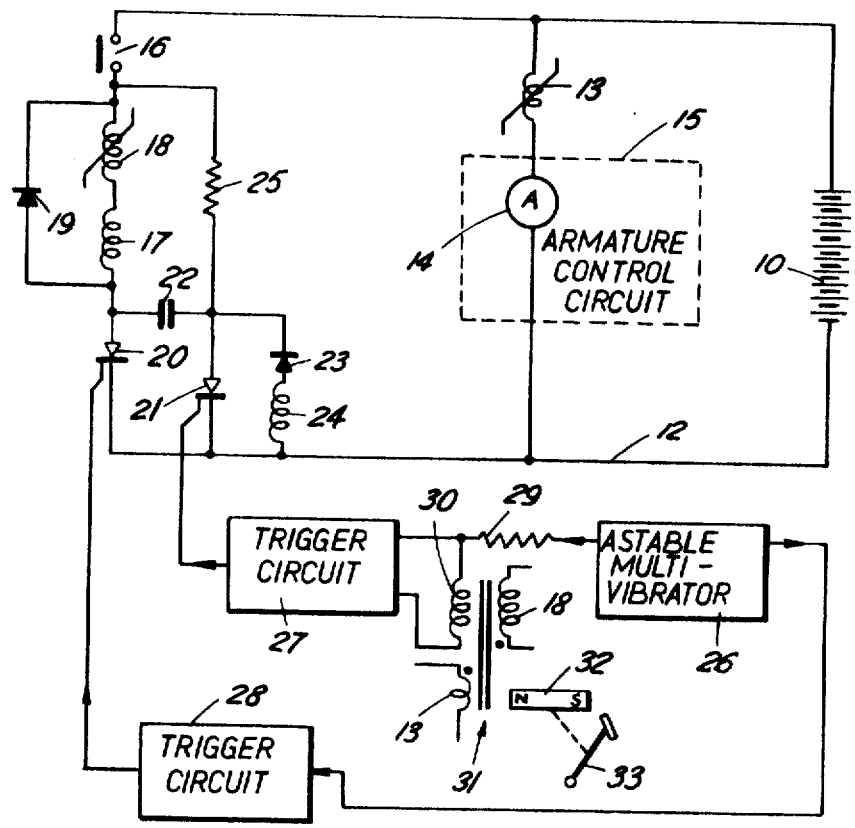

DIRECT CURRENT MOTOR CIRCUITS

BACKGROUND TO THE INVENTION

This invention relates to direct current motor circuits and is particularly concerned with the control of the field current of a direct current motor that has separate field and armature circuits, that is to say a shunt motor for example rather than a series motor.

It has been proposed, for example in our prior British Patent Specification No. 1,040,745, to regulate the shunt field current of a shunt wound motor in accord with the armature current and a speed controller for the motor by arranging a carbon pile variable resistor in series with the shunt field windings of the motor; an electromagnet energized in accord with the armature current is arranged to increase or maintain the pressure on the carbon pile and a mechanical pressure controller can be operable to reduce the pressure on the pile in the sense to increase the speed of the motor.

Such an arrangement has a number of disadvantages, among which is the instability of the carbon pile. Furthermore, the arrangement does not lend itself readily to use in a system in which the motor is energized with pulses of current. This latter type of system is known to provide a way in which the available power in a storage battery can be economically used.

SUMMARY OF THE INVENTION

According to the invention, a motor control circuit comprises a direct current motor having an armature circuit and a separate field circuit, a current controller for the field circuit comprising a controllable rectifier arranged as a power switch and to allow, when triggered, a pulse of current to flow in the field circuit, extinguishing means triggerable to extinguish the conduction of the controllable rectifier, a pulse generator for providing trigger signals alternately for the controllable rectifier and the extinguishing means, a magnetic circuit, means for inhibiting the triggering of the extinguishing means when the flux density in the said magnetic circuit attains a predetermined value, adjustable control means for producing magnetic flux in the magnetic circuit, means for producing an opposing magnetic flux in the magnetic circuit in accord with the field current of the motor, and means for producing magnetic flux in the magnetic circuit in accord with the armature current of the motor.

Normally the extinguishing means would comprise a further controllable rectifier arranged in a commutating circuit with the first-mentioned controllable rectifier.

It will be understood that by "commutating arrangement" is meant the well-known type of arrangement in which the conduction of each rectifier causes the extinction of the conduction of the other rectifier. Such a commutating arrangement commonly includes a "commutating capacitor" coupled between the two controllable rectifiers.

The main purpose of the present invention, as will be apparent hereinafter, is to achieve a balance in the magnetic circuit of the various aforementioned fluxes so as to obtain proper control of the motor under all normal conditions. The balance will be such that for example an increase in the armature current (due to an increased load on the motor) will cause an inhibition of the triggering of the further controllable rectifier, a consequent increase in the field current, which will lead to an appropriate increase in the torque developed by the motor, and the restoration of the original level of flux density in the magnetic circuit. In this way the speed or power of the motor is regulated at a value principally determined by the adjustable control means. Furthermore, the field current cannot fall below a level determined by the pulse generator: the advantage of this will be made apparent hereinafter.

An electrical impedance element, responsive to the flux density in the magnetic circuit, can be used as a variable shunt to inhibit the passage of trigger signals between the pulse generator and the extinguishing means.

The means for producing the said magnetic fluxes in the magnetic circuit may comprise windings arranged for energization by the armature and field currents of the motor respectively and the adjustable control means may comprise an adjustable magnet. It is convenient to constitute the magnetic circuit by a transductor bearing the said two windings and a further winding which would constitute the said impedance element.

BRIEF DESCRIPTION OF THE DRAWING

The accompanying drawing is a simplified diagram of one embodiment of the invention.

DESCRIPTION OF THE PREFERRED EMBODIMENT

In the drawing is shown a battery 10 of which the positive and negative terminals are connected to a positive line 11 and a negative line 12 respectively. Between the lines 11 and 12 are arranged in series a single turn winding 13 and the armature 14 of a shunt-wound motor. Associated with the armature is an armature control circuit 15 which may comprise various contactors and starting resistors but might comprise any appropriate form of circuit for energizing the armature with pulses of current and for determining the direction of current flow through the armature.

The positive line 11 is connected through a contactor 16 to the field circuit of the motor. The field circuit includes a field coil 17 in series with a feedback coil 18, whose purpose will be described hereinafter. A 'free-wheeling' diode 19 is arranged in a loop around the field coil 17 and feedback coil 18.

The lower end of the field coil 17 is coupled to the negative line 12 through a thyristor 20 which constitutes the aforementioned first controllable rectifier. The thyristor 20 is arranged in a commutating circuit with a further thyristor 21; a commutating capacitor 22 couples the anodes of the two thyristors 20 and 21. As is well-known, the conduction of either thyristor would extinguish the conduction of the other.

The anode of the further thyristor 21 is coupled to the negative line 12 through a diode 23 and in inductor 24 and, through a resistor 25, to the junction between the upper end of the feedback coil 18 and the anode of the diode 19. The inductor, as is well-known, serves to increase the charge that the capacitor 22 accumulates between commutating operations, and the diode 23 serves to trap charge on the capacitor 22.

For providing trigger signals to the thyristors 20 and 21 there is provided an astable multivibrator 26 providing outputs alternately to a trigger circuit 27 and a trigger circuit 28. The outputs of the trigger circuits are coupled to the control electrodes of the thyristor 21 and the thyristor 20 respectively.

Between one output of the multivibrator 26 and the input of the trigger circuit 27 is a potential dividing circuit comprising a resistor 29 and an electrical impedance element constituted by a winding 30. This winding is carried on one limb of the core of a transductor illustrated schematically by a magnetic circuit 31. On other limbs of the core are arranged the load current winding 13 and the feedback coil 18. An adjustable magnet 32 is arranged to produce flux in the magnetic circuit 31 normally augmenting that produced by the winding 13, which augmented fluxes are normally in opposition to the flux in the magnetic circuit produced by the feedback coil 18.

It will be appreciated that when the core of the transducer is in saturation the impedance of the winding 30 is very low and the voltage developed thereacross in response to a pulse from the astable multivibrator is insufficient to cause the operation of the trigger circuit 27. In the present circumstances this will mean that where the core of the transductor is in saturation the thyristor 21 will not be triggered into conduction. When however the core of the transductor is nor saturation the impedance of the winding 30 is relatively high and the voltage developed across it due to a pulse from the astable multivibrator is sufficient to cause the triggering of the trigger circuit. This will cause the thyristor 21 to conduct. It will be seen that the other output of the astable multivibrator regularly provides trigger pulses for rendering the trigger circuit 28 operative and accordingly the thyristor 20 conductive.

The permanent magnet 32 alters the flux density in the magnetic circuit independently of the flux due to the armature current and the field current. The essential purpose of the permanent magnet is to determine the power developed by the motor. The permanent magnet is controlled positionally by an accelerator pedal 33 shown diagrammatically coupled to the magnet 32.

The operation of the circuit is as follows.

With the permanent magnet in a position producing maximum flux within the magnetic circuit 31, the firing of the further thyristor 21 is inhibited until the magnetic flux produced by the field current flowing in the feedback coil 18 is of sufficient density to overcome the flux set up by the permanent magnet. Thus the motor field current will be such that the two magnetic fields are in balance. This level of field current is defined as the 'standing field' and is determined by the permanent magnet. Movement of the permanent magnet out of the magnetic circuit 31 reduces the flux density therein below the saturation level of the magnetic circuit and the magnitude of the field current will fall in order to establish a new balance of the magnetic fluxes. When the magnet is moved fully out, there will be no inhibition of trigger pulses passing between the astable multivibrator and the trigger circuit 27 and the field current will be at a predetermined weak value.

When the magnet is fully out of the magnetic circuit the magnetic field set up in the magnetic circuit by the armature current has the same effect as that produced by the permanent magnet and accordingly the magnitude of the field current will increase with an increase in armature current. It is however desirable that this effect should be present only when the armature current is above a fixed magnitude. This can readily be determined by providing various nonmagnetic members in the magnetic circuit. The rate of increase of field current with armature current is determined by the ratio between the numbers of turns in the feedback coil and the winding 13. If the magnitude of the armature current is sufficiently high then there is an inhibition of all the trigger pulses which would otherwise be fed from the astable multivibrator to the thyristor 21 and the thyristor 20 will be continuously conductive, giving rise to a condition of maximum field current.

During acceleration of the motor the armature current will be high but due to the balance provided in the magnetic circuit an appropriate proportion of trigger pulses to the thyristor 21 will be inhibited and the field current will correspondingly increase. As the speed of the motor approaches its maximum the armature current will fall below a level sufficient to cause inhibition of the triggering of the thyristor 31 and the field current will fall to the aforementioned weak value.

Whenever the truck is travelling at full speed and encounters a gradient, the armature current will necessarily rise above a "regulating current" value which will likewise tend to increase the inhibition of trigger pulses to the thyristor 21 and increase the field current as before. This will increase the torque of the motor.

It will be apparent that because the multivibrator provides trigger signals alternately to the thyristors, the circuit will not in use enter a condition in which the thyristor 21 is continuously conductive: accordingly the field current cannot fall below the predetermined weak value. In particular, this prevents excessive speed of the motor when it is lightly loaded.

The "standing field" condition determines the field current during rheostatic and regenerative braking. For the former, no current flows through the armature and the winding 13 when the truck is stationary and under these conditions no flux corresponding to armature current appears in the magnetic circuit 31. For the latter, the normal senses of the armature current and the flux corresponding thereto in the magnetic circuit would be reversed. Thus this magnetic flux would now oppose that due to the permanent magnet and the average strength of the motor's field will be reduced as the magnitude of the regenerated armature current increases.

I claim:

1. A motor control circuit comprising a direct current motor having an armature circuit and a separate field circuit; and a current controller for the field circuit, said current controller comprising a controllable rectifier arranged as a power switch, said controllable rectifier being triggerable into conduction to allow a pulse of current to flow in the field circuit, extinguishing means triggerable to extinguish the conduction of the controllable rectifier, a pulse generator for providing trigger signals alternately for the controllable rectifier and the extinguishing means, a magnetic circuit, means for inhibiting the triggering of the extinguishing means when the flux density in the said magnetic circuit attains a predetermined value, adjustable control means for producing magnetic flux in the magnetic circuit, means for producing in the magnetic circuit an opposing magnetic flux in accord with the field current of the motor and means for producing magnetic flux in the magnetic circuit in accord with the armature current of the motor.

2. A motor control circuit as claimed in claim 1 in which the means for producing the magnetic fluxes in accord with the field current and the armature current produce fluxes normally in opposition during the driving of the motor.

3. A motor control circuit as claimed in claim 2 in which an electrical impedance element responsive to the flux density in the magnetic circuit is disposed as a variable shunt between the pulse generator and the extinguishing means for inhibiting the passage of trigger signals.

4. A motor control circuit as claimed in claim 3 in which the means for producing the said magnetic fluxes in the magnetic circuit include windings arranged for energization by the armature current and the field current respectively; and in which a transductor constitutes said magnetic circuit, said transductor bearing the said windings and a further winding which constitutes the said impedance element.

5. A motor control circuit comprising a direct current motor having an armature circuit and a separate field circuit; and a current controller for the field circuit, said current controller comprising a main controllable rectifier arranged in series with said field circuit, a further controllable rectifier coupled in a commutating circuit with said main controllable rectifier, a pulse generator for providing trigger signals alternately for the controllable rectifiers, a magnetic circuit, means for inhibiting the triggering of the further controllable rectifier when the flux density in the said magnetic circuit attains a predetermined value, adjustable control means for producing magnetic flux in the magnetic circuit, means for producing in the magnetic circuit an opposing magnetic flux in accord with the field current of the motor and means for producing magnetic flux in the magnetic circuit in accord with the armature current of the motor.

6. A motor control circuit as claimed in claim 5 in which said magnetic circuit comprises a transductor and the said means for producing the said magnetic fluxes in the magnetic circuit include windings disposed on said transductor and in series with the armature circuit and the field circuit respectively; and in which a further winding on said transductor constitutes a variable shunt for inhibiting the passage of trigger signals between the pulse generator and the said further controllable rectifier.